United States Patent
Samson et al.

(10) Patent No.: US 6,226,308 B1
(45) Date of Patent: May 1, 2001

(54) OPTICAL WAVEGUIDE, WAVEGUIDE AMPLIFIER AND LASER

(75) Inventors: Bryce Neilson Samson, Horseheads, NY (US); Daniel William Hewak, Southampton (GB); Richard Ian Laming, Southampton (GB); David Neil Payne, Southampton (GB); William Simon Brocklesby, Lyndhurst (GB)

(73) Assignee: Pirelli Cavi e Sistemi SpA (IT)

( * ) Notice: Subject to any disclaimer, the term of this patent is extended or adjusted under 35 U.S.C. 154(b) by 0 days.

(21) Appl. No.: 09/029,219

(22) PCT Filed: Aug. 23, 1996

(86) PCT No.: PCT/GB96/02060

§ 371 Date: Oct. 26, 1998

§ 102(e) Date: Oct. 26, 1998

(87) PCT Pub. No.: WO97/08790

PCT Pub. Date: Mar. 6, 1997

(30) Foreign Application Priority Data

Aug. 25, 1995 (GB) .................................................. 9517490

(51) Int. Cl.[7] .................................................. H01S 3/17
(52) U.S. Cl. .................................................. 372/40; 372/6
(58) Field of Search .................................. 372/39, 40, 64, 372/6; 501/37, 40

(56) References Cited

U.S. PATENT DOCUMENTS

| | | | |
|---|---|---|---|
| 5,251,062 | * 10/1993 | Snitzer et al. | 372/40 |
| 5,309,452 | * 5/1994 | Ohishin et al. | 372/6 |
| 5,378,664 | * 1/1995 | Becker et al. | 501/40 |
| 5,379,149 | 1/1995 | Snitzer et al. . | |
| 5,568,497 | * 10/1996 | Bishop et al. | 372/40 |
| 5,629,953 | * 5/1997 | Bishop et al. | 372/39 |
| 5,936,762 | * 8/1999 | Samson et al. | 372/6 |

OTHER PUBLICATIONS

J. Heo et al., "Spectroscopic Analysis of $Tm^{3+}$ in $PbO-Bi_2O_3-Ga_2O_3$ Glass", Applied Optics, 34(21):4284–4289 (1995).

D. Hewak et al., "Quantum–Efficiency of Praseodymium Doped Ga:La:S Glass for 1.3 μm Optical Fibre Amplifiers", 8342 IEEE Photonics Technology Letters, 6(5):609–612 (1994).

Hoa et al; Spectroscopic analysis of Tm 3+ in PbO–Bi/2/3–Ga/2O/3 glass; Appl. Optics/vol. 34, No. 21/Jul. 20, 1995.*

Hewak et al; Quantum–Efficiency of Praseodymium Doped Ga:La:S Glass for 1.3 micrometer Optical Fiber Amplofiers; IEEE Photonics Technology Letters May, No. 5.*

* cited by examiner

Primary Examiner—Leon Scott, Jr.
(74) Attorney, Agent, or Firm—Finnegan, Henderson, Farabow, Garrett & Dunner, L.L.P.

(57) ABSTRACT

An optical fibre amplifier, laser or superluminescent source, consisting of a chalcogenide glass matrix hosting trivalent rare earth ions and which is doped with oxide in the form of a metallic oxide. The device utilizes the properties of the added oxide to improve the fabrication and efficiency of optical waveguide sources, in particular for applications around 1.3 μm. Specifically, the oxide broadens the wavelength range for pump absorption, broadens the wavelength range for light emission, increases the device efficiency through a change in lifetime of certain laser levels and modifies properties of the glass to prevent crystallization during fiber fabrication. The device exploits the intentional addition of oxide to improve amplifier, laser, glass and fiber properties.

43 Claims, 10 Drawing Sheets

OPTICAL WAVEGUIDE, WAVEGUIDE AMPLIFIER AND LASER

This invention relates to optical waveguides, optical waveguide amplifiers and lasers.

Optical waveguide amplifiers and lasers, and in particular optical fibre amplifiers, are used widely in the telecommunications industry.

An example of a known optical fibre amplifier is the erbium doped fibre amplifier (EDFA) which operates in the so-called third telecoms window (wavelengths around 1500 nanometres (nm)). These devices are characterized by their high gain (around 30 decibels (dB)) achieved with limited pump power (less than 50 milliwatts (mW)), which means that pumping can be performed using a single laser diode unit.

However, in the important second telecoms window (wavelengths around 1.3 micrometres ($\mu$m)), known optical fibre amplifiers operate with a much lower efficiency. The best performance reported so far has been obtained using trivalent praseodymium ($Pr^{3+}$) doped fluoride fibre amplifiers (PDFFAs), which achieve a small signal gain of about 23 dB with about 120 mW of pump from a single semiconductor laser diode unit. Operating the pump diode at high drive current to achieve this pump power can severely curtail the lifetime of the diode. This problem has limited the application of this amplifier unit.

It has been proposed to use chalcogenide glass as a host for the rare earth dopants praseodymium or dysprosium to provide more efficient amplification at 1.3 $\mu$m. "Chalcogeride", for the purposes of this description, means that the glass contains sulphur (S), tellurium or selenium, so examples of this type of glass can contain arsenic trisulphide, arsenic selenide, germanium sulphide, gallium sulphide, lanthanum sulphide and/or other elements. Chalcogenide glasses typically have properties which make them useful as a host glass for rare earth doped amplifiers for optical signals in the 1.3 $\mu$m wavelength range, in particular the glass typically having a maximum phonon energy of less than 450 $cm^{-1}$. The low phonon energy decreases the probability of non-radiative decay of the rare earth dopant excited state, thus allowing more efficient use of pump power for signal amplification. Modelling has predicted that an optimised chalcogenide glass waveguide doped with praseodymium and pumped with about 50 mW at a suitable wavelength will provide a small signal gain in excess of 20 dB. A similar waveguide doped with dysprosium will again provide in excess of 20 dB of small signal gain for 50 mW of pump power.

However, a low-loss fibre from a suitable chalcogenide glass is extremely difficult to fabricate, as the glass is prone to crystallization which severely limits fibre transmission and strength. The difficulties in fibre drawing currently limit the exploitation of chalcogenide based optical fibres. Similar difficulties are experienced in fabricating planar optical waveguides.

In order to improve amplifier performance, it has been preferred that substantially all impurities be removed from the glass before waveguide fabrication. Of particular concern are oxide impurities in the from of hydroxides, sulphates and metallic oxides. Among these, metallic oxides are a known by-product of the formation of metallic sulphides used in chalcogenide glass preparation and are difficult to remove.

Knowledge to date regarding uncontrolled oxide impurities was that they decrease the device efficiency when an optical waveguide amplifier or laser is pumped in the conventional way. This loss of efficiency results from the decreased lifetime of the rare earth ion in the vicinity of an oxide impurity. The impurity locally raised the maximum phonon energy, thereby increasing the probability of non-radiative decay of the ion and preventing emission at the wavelength preferred. Accordingly, in previous chalcogenide glass amplifiers substantially all of the oxides have been removed from the glass before or during fabrication of the waveguide.

This invention provides an optical waveguide amplifier comprising:

a chalcogenide glass waveguide doped at least in part with
(a) a rare earth dopant; and
(b) oxygen in the form of a metallic oxide; wherein the total metal oxide content is about 0.01% to about 50% of the total weight of the glass; and means for supplying pump radiation to the waveguide.

The invention recognises that the intentional doping of a chalcogenide glass with a metallic oxide which is then used to form an optical waveguide amplifier or laser can lead to several significant improvements over the prior art.

Doping with metal oxides in amplifier fabrication goes against conventional wisdom and teaching in this area. For example, U.S. Pat. No. 5,378,664 teaches extensive techniques using heat in the presence of flowing hydrogen sulphide for converting oxides into sulphides before or after using the materials as dopants. Previously, oxides have been regarded as impurities to be removed rather than as dopants with any beneficial effect (other than on glass stability), and so oxide-containing fibres have not been considered for use as amplifiers. In particular, a perceived disadvantage of the intentional doping of the chalcogenide glass with a metallic oxide has been that it results in a possible reduction in the small signal device efficiency (especially in the case of praseodymium-doped amplifiers). However, in embodiments of the invention this long-standing technical prejudice is overcome and oxide-doped chalcogenide waveguides are proposed for use in optical amplifiers.

The advantages of oxide doped chalcogenide glass in embodiments of the invention can include:

(i) a potential increase in glass stability by the reduction of the tendency of these glasses towards crystallization;

(ii) a modification of the glass viscosity during fibre drawing to ease the difficulties of fibre fabrication;

(iii) a broadening of the emission wavelength range around 1.3 $\mu$m from about 90 nm to greater than 120 nm;

(iv) a potential increase in efficiency when operated as a high output power amplifier through the decreased lifetime of the lower transition levels by reducing bottlenecking;

(v) an increase in the width of the ground state absorption spectrum allowing a greater range of pump wavelengths.

Embodiments of the invention show that the controlled addition of a predetermined level of oxide can improve the power amplifier device performance (e.g. when operating with output powers greater than about 1 mW) and that any detrimental effects on small signal amplifier performance (e.g. when operating with signal levels less than about −10 dBm (dB relative to 1 mW) and gain greater than about 15 dB) can be reduced through selection of suitable pump wavelengths.

It has also been found that the pump wavelength can have a strong bearing on the usefulness of the materials in amplification. Previously, pump wavelengths have tended to be selected at the peak absorption of the rare earth in the glass to be pumped. In the new oxide-doped glasses presented in this description, it is found that rare earth dopants can occupy "oxide" sites or "non oxide" sites in the glass. The non oxide sites can be excited by pump wavelengths at or near to the peak absorption to provide a small signal amplifier. However, if the pump wavelength is shifted away from the peak absorption and the device is pumped at shorter wavelengths to excite dopant ions at the oxide sites, a better performance can be obtained from the resulting device as a power amplifier.

This invention also provides a method of manufacture of an optical waveguide amplifier, the method comprising adding a metal oxide during formation of a doped a glass optical waveguide, the resulting waveguide having an oxide content of at least 0.01% by weight.

This invention also provides an optical waveguide formed at least in part of a chalcogenide glass doped with (a) a rare earth dopant; and (b) oxygen in the form of a metallic oxide;

wherein the total metal oxide content is about 5% to about 50% of the total weight of the glass.

Additional aspects and preferred features of the invention are defined in the appended claims. It will be appreciated that where a preferred feature is described or defined with reference to one aspect of the invention, it is equally applicable to other aspects of the invention.

The invention will now be described by way of example with reference to the accompanying drawings, throughout which like parts are referred to by like references, and in which.

Properties of various types of glass containing different amounts of metal oxide will be described below. All but one of the glasses are to be considered as embodiments of the present invention, while the remaining glass (a glass containing substantially 0% oxide) is described for comparison of properties.

The bulk glass samples to be described were prepared in the molar ratio $70Ga_2S_3:30La_2S_3$ by melting in a vitreous carbon crucible. This corresponds to a weight ratio of $60Ga_2S_3:40La_2S_3$.

The samples were doped with praseodymium by the addition of $Pr_2S_3$ measured by weight, giving a $Pr^{3+}$ concentration of about 500 ppm (parts per million) (however, in other embodiments, $Pr^{3+}$ concentrations of between about 10 ppm and about 20000 ppm are used). The low dopant level ensured that concentration effects could be ignored in the measurements to be made.

Additionally the samples were doped with a varying amount of $La_2O_3$ also measured by weight, resulting in weight percentages of zero, one, five and ten percent respectively. This allowed the effect of lanthanum oxide on the optical properties of $Pr^{3+}$ doped GLS glass to be investigated. Sample oxide levels were tightly controlled, with a residual oxide level in the 0% sample of 0.2% as measured by chemical vapour analysis upon burning the sample.

In other embodiments, a different metal oxide is used, preferably selected from group consisting of yttrium oxide, ytterbium oxide, lutecium oxide, gallium oxide, germanium oxide, barium oxide, cesium oxide, arsenic oxide, cerium oxide, praseodymium oxide, neodymium oxide, samarium oxide, terbium oxide, dysprosium oxide, holmium oxide, erbium oxide and thulium oxide.

Optionally a sensitising agent such as ytterbium can be added to the glass, to increase absorption at the pump wavelength.

The rare earth dopant (as above, praseodymium) could instead be selected from the group consisting of cerium, neodymium, samarium, terbium, dysprosium, holmium, erbium and thulium.

Further (additional) dopants could be used, such as metals from group 3A of the periodic table. As described above, gallium is a preferred dopant but in other embodiments germanium, barium, cesium and/or arsenic is used.

As mentioned above, another dopant could be added, preferably selected from lanthanum, yttrium, ytterbium and lutecium.

In further embodiments different percentage contents (by weight) of metal oxide are used. Particularly favourable results are obtained in the following approximate ranges of metal oxide content by weight:

0.01% to 50%
1% to 50%
2% to 50%
5% to 50%
10% to 50%
20% to 50% but in general, embodiments of the invention encompass a wide range of possible metal oxide content up to about 50%, with the beneficial effects tending to increase with increasing oxide content. Accordingly, further embodiments of the invention have the following approximate oxide percentage contents by weight: 1,2,3,4,5,6,7,8,9,10,11,12,13,14,15,16, 17,18,19,20,21,22,23,24,25,26,27,28,29, 30,31,32,33,34,35, 36,37,38,39,40,41,42,43,44,45,46,47,48,49,50.

In the results described below with reference to FIGS. 1 to 8, it will be shown that intentional oxide doping of chalcogenide glass can provide optical fibres (or other waveguides) with suitable properties for use as amplifiers and in lasers and superluminescent sources. Examples of applications of the material will then be described with reference to FIGS. 9 to 12.

It will also be shown that the pump wavelength can have a strong bearing on the usefulness of the materials in amplification. Previously, pump wavelengths have tended to be selected at the peak absorption of the glass to be pumped. In the new oxide-doped glasses presented in this description, it is found that rare earth dopants can occupy "oxide" sites or "non oxide" sites in the glass. The non oxide sites can be excited by pump wavelengths at or near to the peak absorption to provide a small signal amplifier. However, if the pump wavelength is shifted away from the peak absorption and the device is pumped at shorter wavelengths to excite dopant ions at the oxide sites, a better performance can be obtained from the resulting device as a power amplifier.

For example, in a praseodymium-doped GLS fibre, pumping is normally performed at the peak absorption wavelength of about 1020 nm. However, in an oxide-doped fibre as described herein, a better power amplifier performance (e.g. for output powers greater than about 1 mW) can be obtained by pumping the amplifier at wavelengths greater than about 900 nm and shorter than 1100 nm, preferably being shorter than about 1010 nm (e.g. 980 nm). This device and the pumping arrangement described preferentially excites or utilises the dopant ions in the "oxide" sites of the glass.

However, in the case of a small signal amplifier (e.g. when the input power is less than −10 dBm and the gain is greater than about 15 dB) it is preferred to pump at wavelengths longer than about 1000 nm. In this regime, the pumping arrangement utilises dopant ions in the "non-oxide" sites of the glass.

A similar pump wavelength improvement is provided for a dysprosium-doped amplifier using any of the absorption bands around 800 nm, 910 nm, 1070 nm and 1260 nm.

Absorption spectra of the bulk glasses were recorded using a Perkin-Elmer two beam spectrophotometer. Excitation of the $Pr^{3+}$ $^1G_4$ level was performed using a cw (continuous wave) Titanium:Sapphire laser, whose output was chopped using a mechanical chopper wheel. Side-light fluorescence at 1.3 $\mu$m was detected by focusing onto a small peltier-cooled InGaAs (Indium gallium arsenide) detector, which was connected through a preamplifier to a Stanford lock-in amplifier. The detector was mounted behind a 0.25 m spectrometer and at all times a 1.2 $\mu$m long pass filter covered the entrance slit, so preventing the passage of laser scatter to the detector. When recording fluorescence spectra, a conventional personal computer was used to scan the spectrometer and collect the data. Lifetime data was collected by replacing the lock-in amplifier with a digital oscilloscope and suitably averaging the signal. The laser turn off time was typically less than 5 $\mu$s (microseconds), and the detector response was measured to be of the order of 30 $\mu$s. Fluorescence spectra and lifetimes were recorded at room temperature, and at 15K (degrees Kelvin) using a closed cycle helium cryostat. Additionally for detection of fluorescence in the visible a photomultiplier tube replaced the InGaAs detector behind the spectrometer.

The spectra and other information obtained by these techniques will be discussed in detail below.

Figure 1:
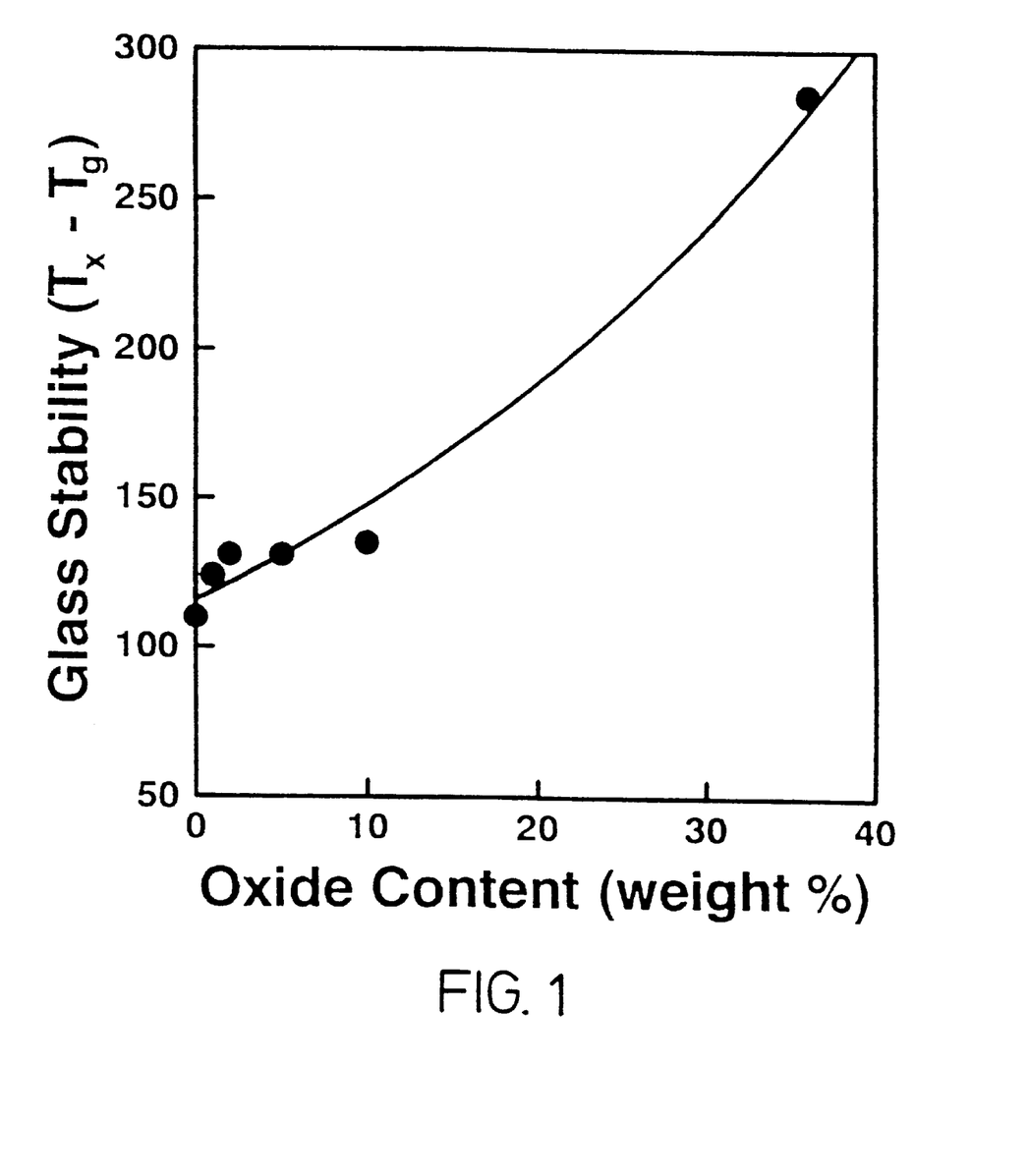
FIG. 1 is a schematic graph illustrating the stability of GLS (gallium-lanthanum-sulphur) glass as a function of oxide content.

FIG. 1 is a schematic graph illustrating the stability of GLS glass as a function of oxide content, illustrating the improvement in the so-called "$T_x$-$T_g$ gap" as the content of lanthanum oxide increases. Fibre drawing is known to be facilitated by a larger temperature difference between $T_x$ and $T_g$. The temperature difference $T_x$-$T_g$ is the difference between the onset of crystallisation temperature ($T_x$) and the glass transition temperature ($T_g$). This difference is an indication of the glass stability and fibre drawing normally takes place at a temperature above $T_g$ and below $T_x$ for these chalcogenide glasses. Hence, a larger temperature difference or gap facilitates fibre drawing.

Figure 2:
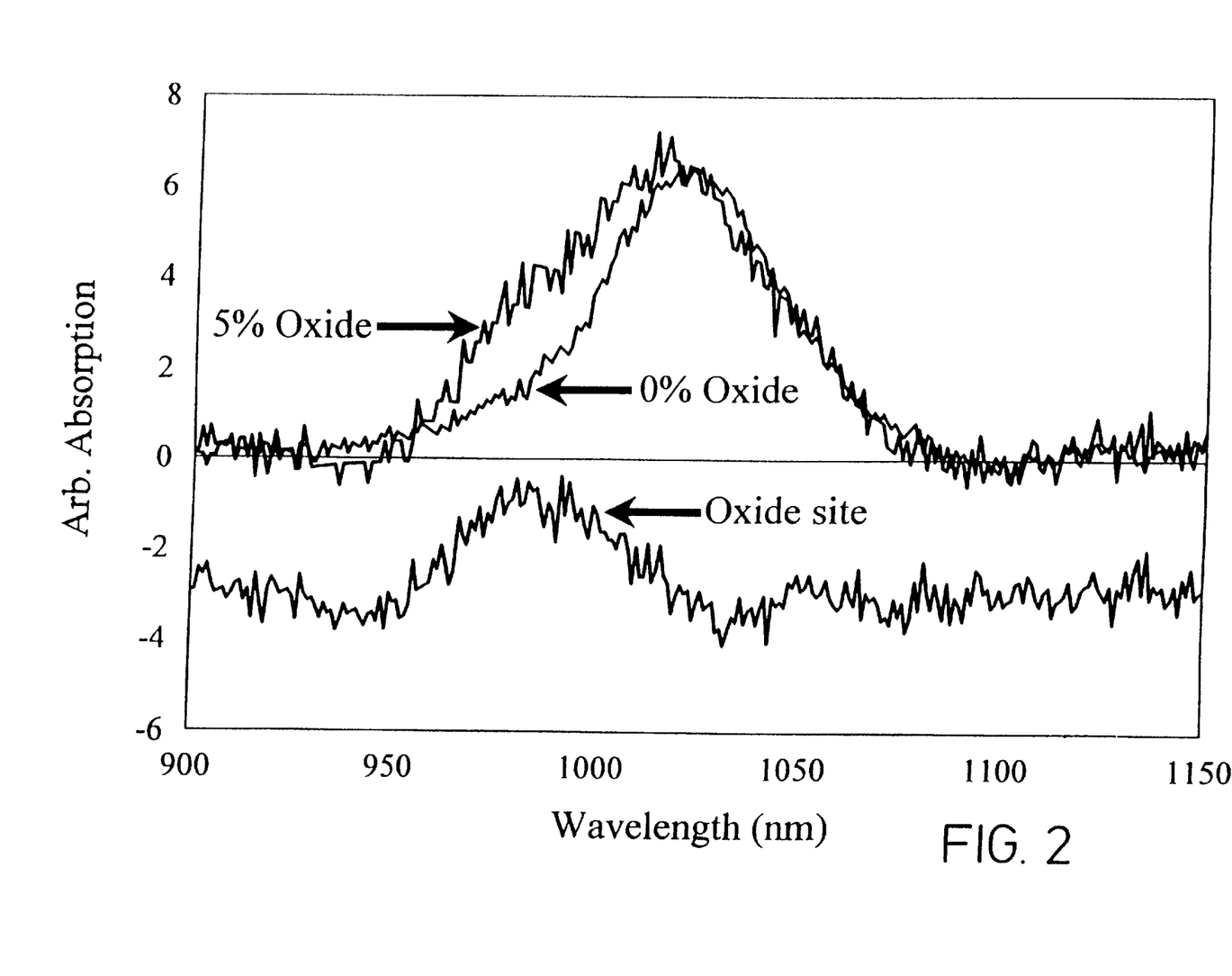
FIG. 2 is a schematic graph illustrating a scaled $PR^{3+}$:GLS 1.02 $\mu$m absorption spectra for the 0% and 5% lanthanum oxide samples.

FIG. 2 is a schematic graph illustrating a scaled $PR^{3+}$:GLS 1.02 $\mu$m absorption spectra for the 0% and 5% lanthanum oxide samples. Broadening of the absorption is seen on the short wavelength wing in the 5% sample. The bottom of the diagram shows the subtraction of the two spectra, illustrating the absorption profile associated with the addition of lanthanum oxide.

Figure 3:
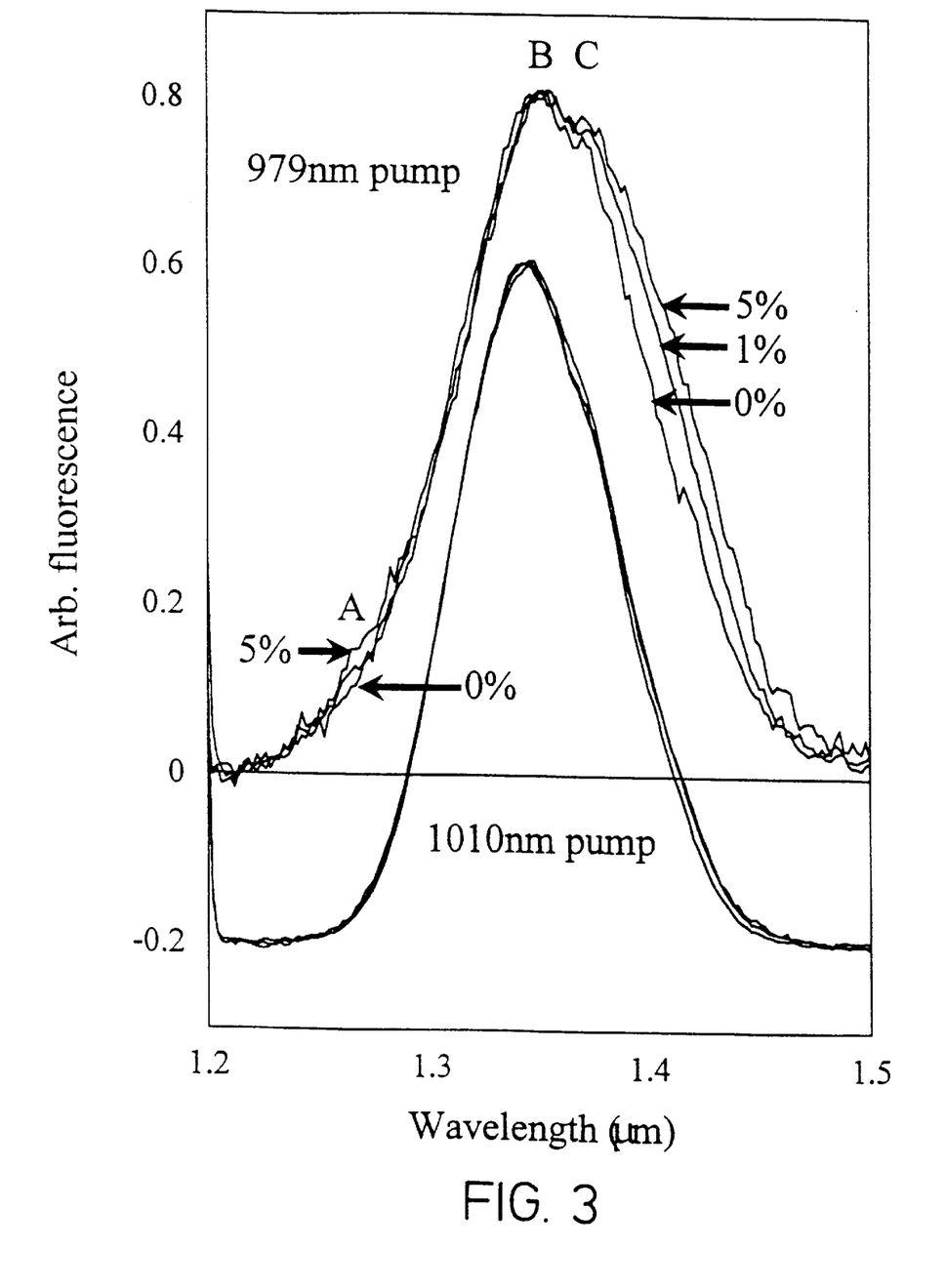
FIG. 3 is a schematic graph illustrating a scaled $PR^{3+}$:GLS 1.3 $\mu$m $^1G_4 \rightarrow ^3H_5$ emission spectra at 300K as a function of the lanthanum oxide content of the glass.

FIG. 3 is a schematic graph illustrating a scaled $Pr^{3+}$:GLS 1.3 $\mu$m $^1G_4 \rightarrow ^3H_5$ emission spectra at 300K as a function of the lanthanum oxide content of the glass.

The spectra are illustrated at two pump wavelengths, 979 nm and 1010 nm. At 979 nm, a broadening of the spectra with increasing lanthanum oxide is seen through a relative increase in the magnitudes of the peaks A and C. At 1010 nm, the spectra are independent of lanthanum oxide.

This Figure shows how the 1.3 $\mu$m emission varies as a function of lanthanum oxide in the sample. When pumping the whole $^1G_4$ inhomogeneous profile at 979 nm, three emission peaks are evident at ~1.27, 1.35 and 1.37 $\mu$m, denoted by A, B and C. The spectra have again been normalised to the 1.35 $\mu$m peak. It can be seen that peaks A and C increase in relative intensity with increasing lanthanum oxide, effectively broadening the emission spectrum, particularly on the low energy wing. However when pumping only a fraction of the inhomogeneous profile at 1010 nm, it can be seen that not only does the emission narrow to a single peak at ~1.35 $\mu$m, but the emission becomes virtually independent of the lanthanum oxide content.

These room temperature results demonstrate a correlation between tuning the pump laser to higher energy and increasing the relative amount of lanthanum oxide in the sample, in that both effectively broaden the emission spectrum through an increase in the size of the peaks A and C. This therefore confirms that there are two $Pr^{3+}$ sites within the glass, with the high energy site being dependent on the lanthanum oxide content of the glass. Combining the fluorescence results with the earlier absorption results confirms that as the pump is tuned from high to low energies, there is a transition from a regime of exciting both the oxide and sulphide sites to only exciting the sulphide site. Lanthanum oxide is therefore seen to increase the inhomogeneous width of the $Pr^{3+}$ $^1G_4 \rightarrow ^3H_5$ transition when pumping at high energy.

Figure 4:
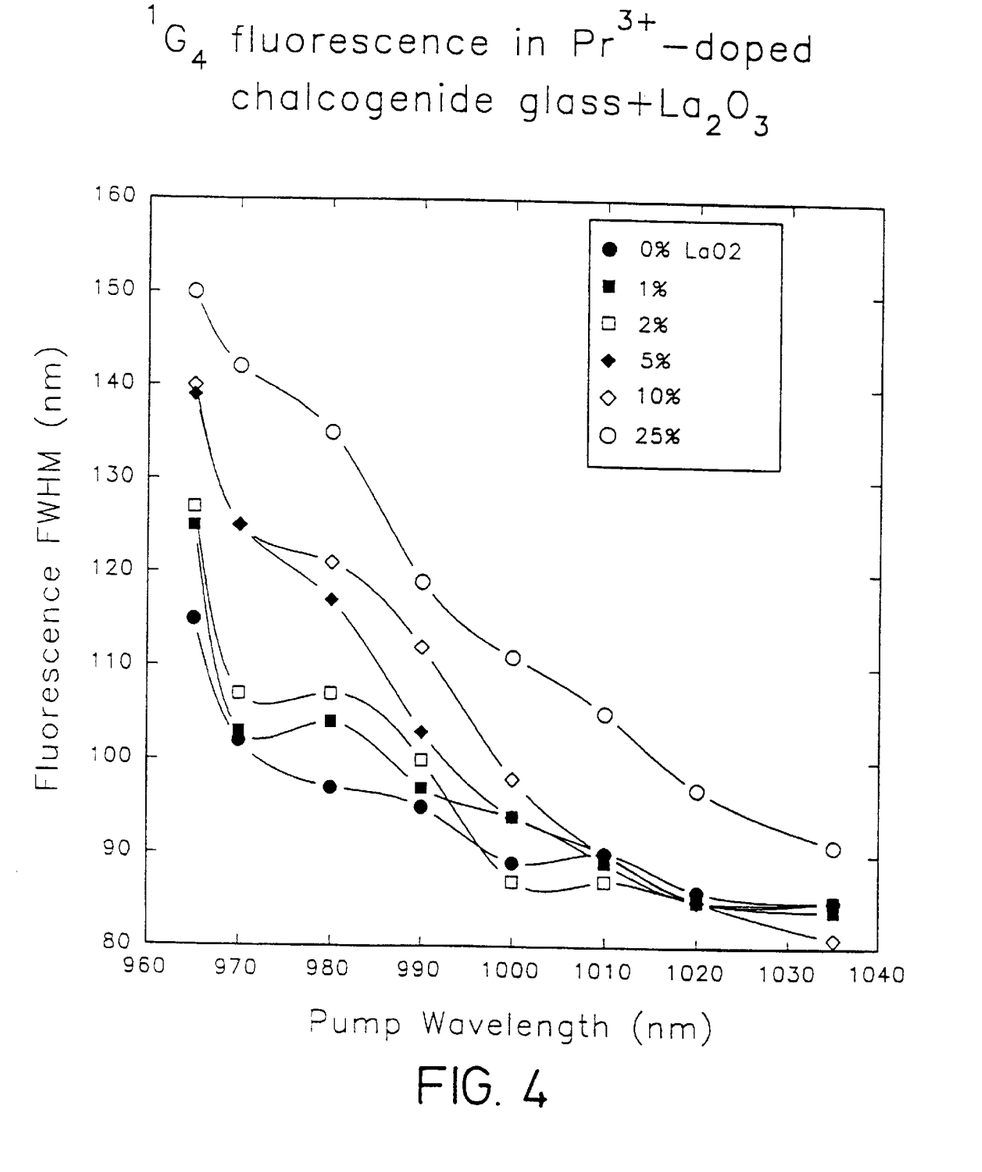
FIG. 4 is a schematic graph providing a summary of $Pr^{3+}$-$^1G_4$-$^3H_5$ fluorescence as a function of lanthanum oxide added to the glass.

FIG. 4 is a schematic graph providing a summary of $Pr^{3+}$-$^1G_4$-$^3H_5$ fluorescence as a function of lanthanum oxide added to the glass. This graph shows that increasing the oxide content of the glass can increase the available bandwidth around 1300 nm when operated as an amplifier pumped at wavelengths shorter than about 1010 nm (e.g. 980 nm). Applications for a large bandwidth amplifier are where multiple signal channels are used (e.g. in wavelength division multiplexing).

Figure 5:
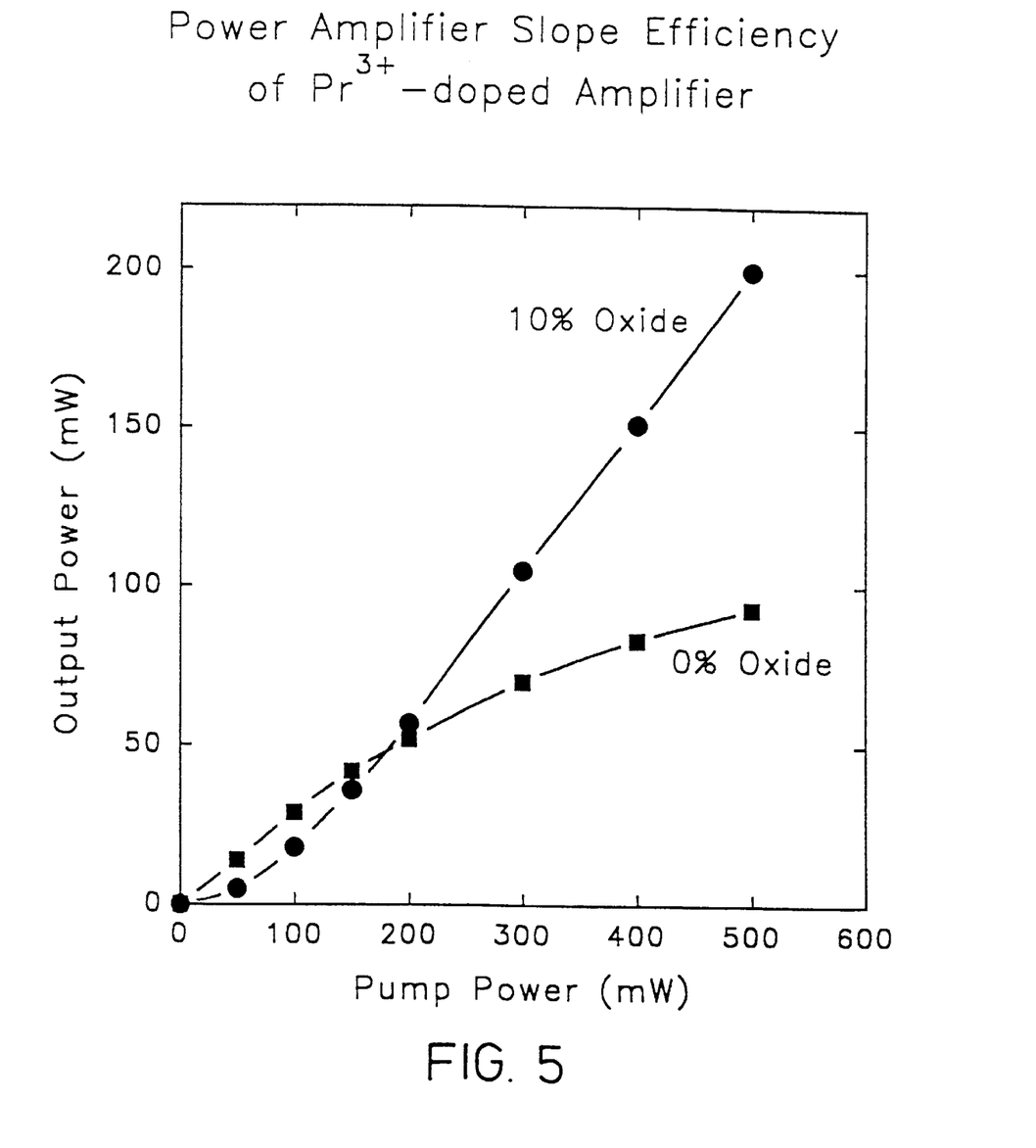
FIG. 5 is a schematic graph illustrating power amplifier performance at 1.3 $\mu$m for $Pr^{3+}$-doped chalcogenide glass with and without lanthanum oxide.

FIG. 5 is a schematic graph illustrating power amplifier performance at 1.3 $\mu$m for $Pr^{3+}$-doped chalcogenide glass with and without 10% by weight lanthanum oxide. The pump wavelength is 980 nm and the input power 0 dBm. This Figure shows that a power amplifier having a 10% oxide content offers a higher output power (vertical axis) for the same pump power (horizontal axis) when compared to the device having a substantially 0% oxide content, for pump powers above about 200 mW. This improved performance is achieved via a reduction in the lifetime of the $^3H_5$ energy level in the "oxide" sites. A shorter lifetime for this energy level reduces any bottlenecking effects at the lower energy level for the 1300 nm transition.

Figure 6:
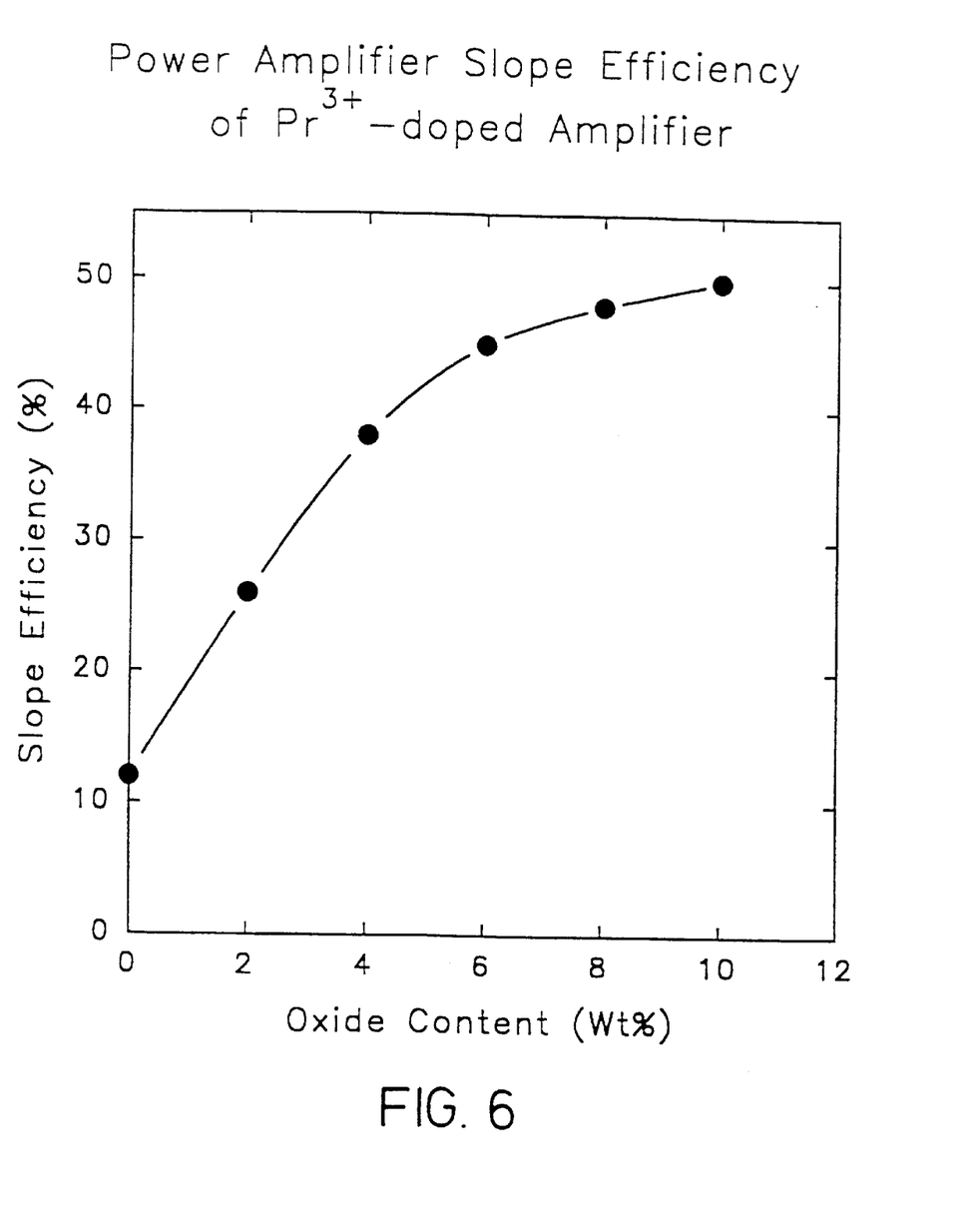
FIG. 6 is a schematic graph providing a summary of power amplifier performance (slope efficiency) as a function of lanthanum oxide added to the chalcogenide glass.

FIG. 6 is a schematic graph providing a summary of Power amplifier performance (slope efficiency) as a function of percentage by weight of lanthanum oxide added to the chalcogenide glass. The pump wavelength is 980 nm and the input power 0 dBm.

Figure 7:
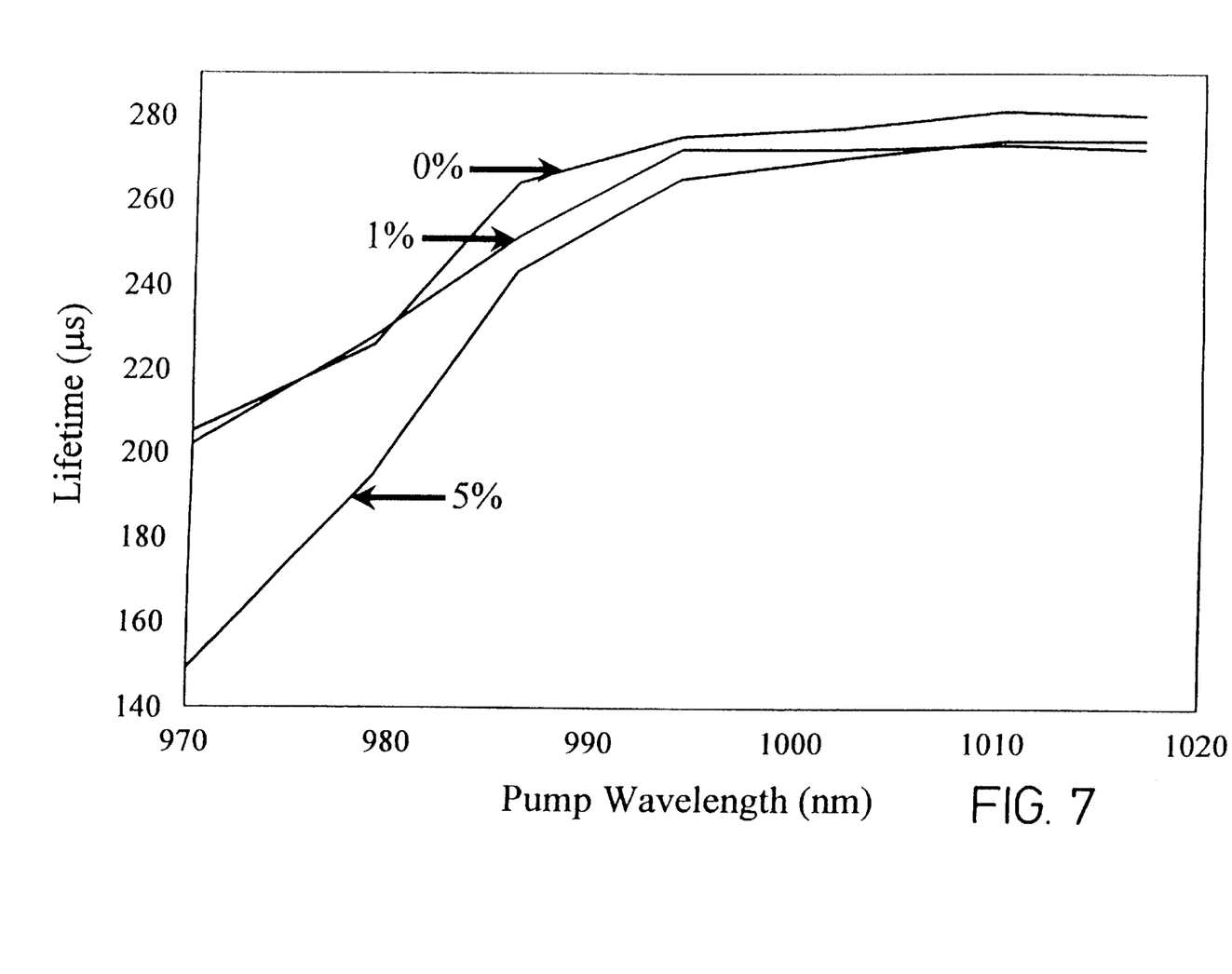
FIG. 7 is a schematic graph illustrating a single exponential $PR^{3+}$:GLS 1.3 $\mu$m lifetimes at 300K as a function of pump wavelength.

FIG. 7 is a schematic graph illustrating a single exponential $Pr^{3+}$:GLS 1.3 μm lifetimes at 300K as a function of pump wavelength. The lifetimes are seen to increase with increasing pump wavelength. At short pump wavelengths, the lifetimes decrease with an increasing lanthanum oxide content of the glass; however the lifetime becomes independent of oxide content of the glass at longer pump wavelengths (i.e. greater than about 1000 nm).

Figure 8:
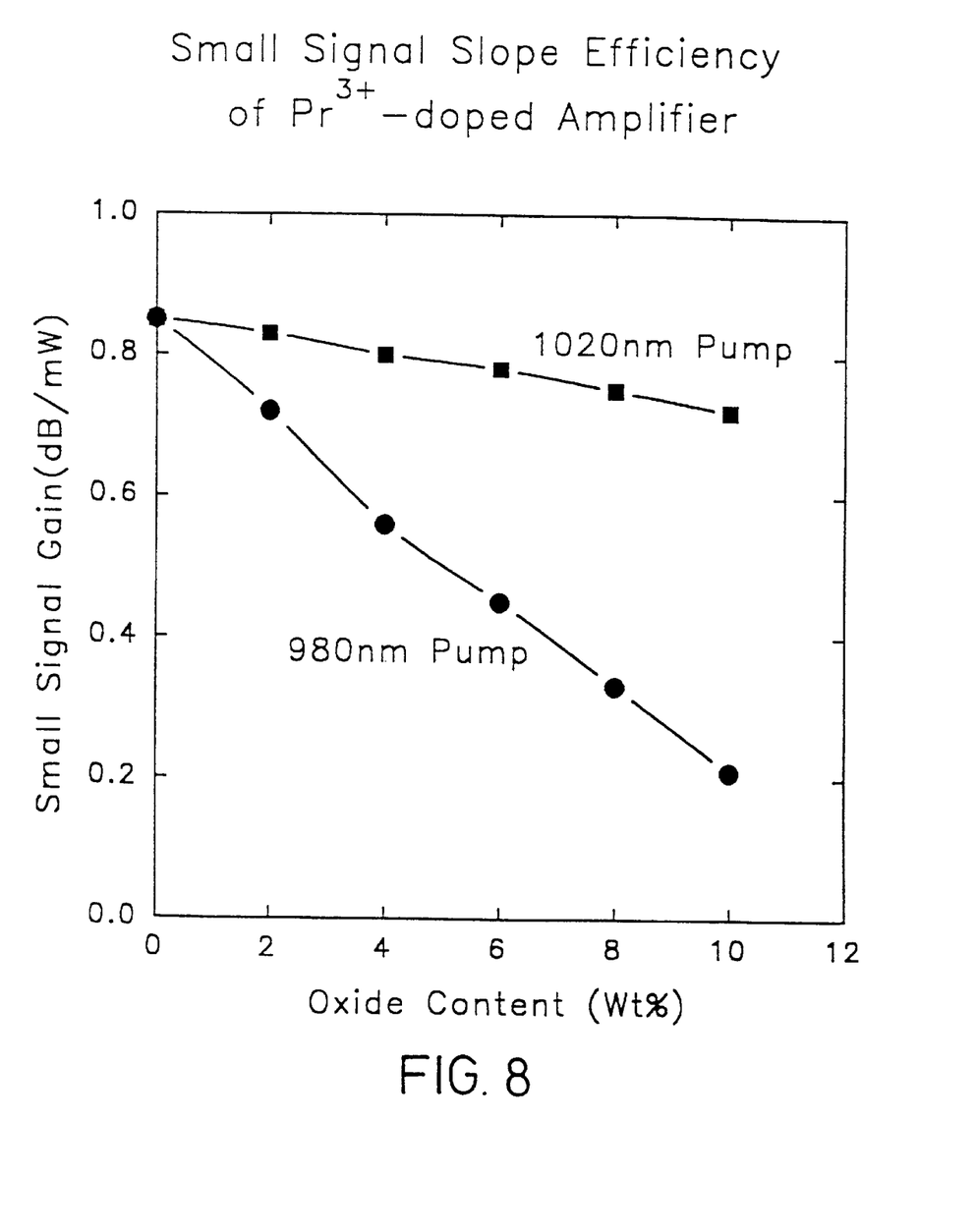
FIG. 8 is a schematic graph illustrating small signal amplifier performance as a function of lanthanum oxide content of the glass.
Figure 9A:
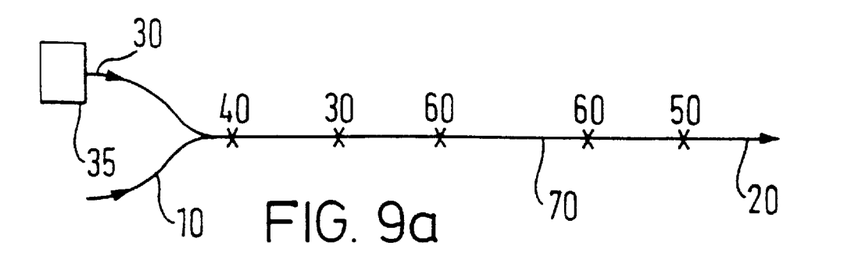
FIGS. 9a to 9d are schematic amplifier configurations using various pumping techniques.
Figure 9B:
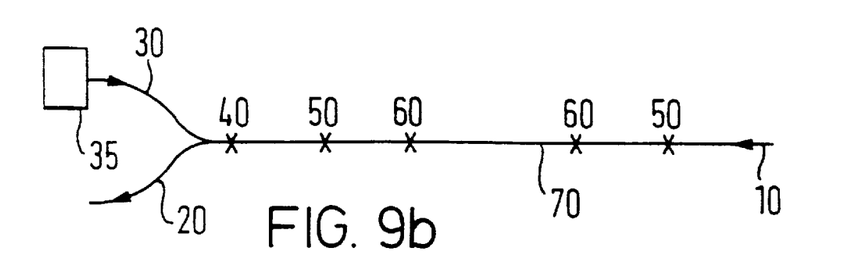
Figure 9C:
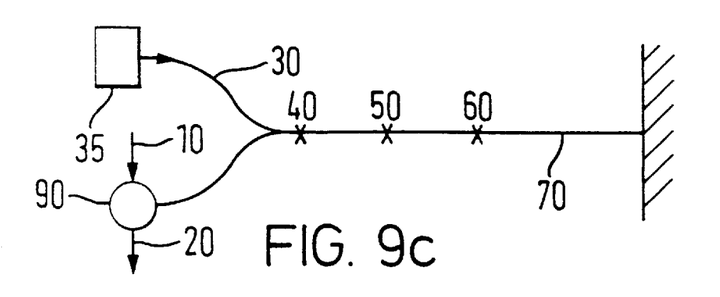
Figure 9D:
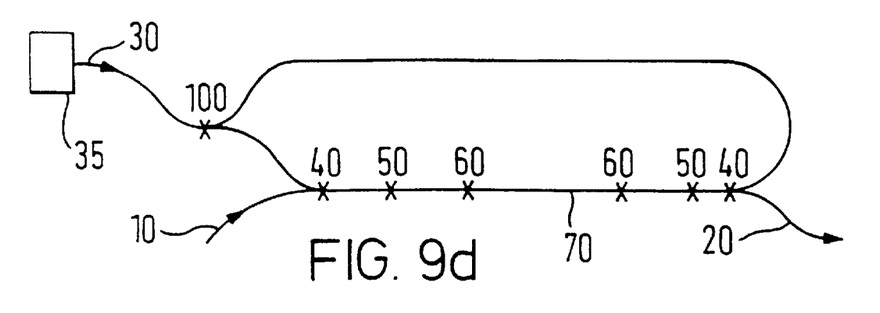

FIG. 8 is a schematic graph illustrating small signal amplifier performance (i.e. input signal power less than about −10 dBm and gain greater than about 15 dB) as a function of lanthanum oxide content of the glass. At pump wavelengths shorter than about 1010 nm (e.g. 980 nm), the amplifier utilises the "oxide" sites and the shorter $^1G_4$ lifetime decreases the amplifier efficiency as more oxide is added to the glass. However, by pumping at wavelengths greater than about 1000 nm (e.g. 1020 nm) the non-oxide sites are utilised and the device efficiency is not strongly dependent on the oxide content of the glass.

Applications of the glass will now be described with reference to FIGS. 9a to 12. In these Figures, the glass is demonstrated as an optical fibre. However, it will be appreciated that other waveguides (such as a planar waveguide) could be employed.

The particular examples here relate to single mode optical fibres in which the core of the fibre is doped as described above. However, it will be appreciated that the cladding could also (or even instead) be doped, and that similar principles apply to multi-mode optical fibres.

FIGS. 9a to 9d are schematic diagrams of oxide-doped glass fibre amplifiers, using various pump configurations. Each of the configurations uses an angled splice between a high NA (numerical aperture) glass fibre doped as described above and a high NA silica fibre, which is tapered. The configurations shown in FIGS. 9a to 9d are referred to as "co-directional", "counter-directional", "double-pass" and "bi-directional" pumping respectively.

In each of FIGS. 9a to 9d, signal light is input at an input port 10 and output at an output port 20. The pump signal is input from a pump source 35 (such as a diode laser (operating at various ones of the wavelengths described above or others such as 1280 nm), a neodymium-yttrium-aluminium-garnet laser for pumping the amplifier at a pump wavelength of about 1064 nanometres or a neodymium-yttrium-lanthanum-fluoride laser for pumping the amplifier at a pump wavelength of about 1047 nanometres) at a pump input 30. FIGS. 9a to 9d also show a number of interconnected optical fibre units, referred to by the following reference numbers:

| Reference Number | Unit |
|---|---|
| 40 | pump signal multiplexer |
| 50 | tapered silica fibre |
| 60 | angled splice |
| 70 | Metal Oxide-Doped glass fibre |
| 80 | mirror having high reflectance at pump and signal wavelengths |
| 90 | optical circulator |
| 100 | 50:50 coupler |

Figure 10:
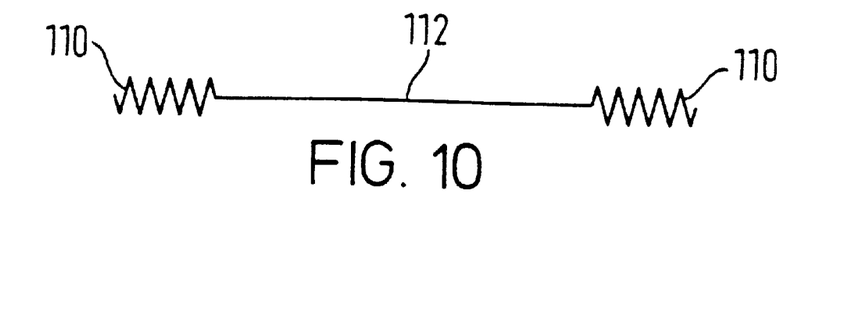
FIG. 10 is a schematic diagram of a laser.

FIG. 10 is a schematic diagram of an optical fibre laser using an amplifier as described above. The laser uses fibre gratings 110 at each end of the amplifier fibre 112 (with or without further non-amplifying fibre to provide an external cavity) to provide reflecting means for promoting lasing within the amplifier fibre. The amplifier can be pumped using any of the general techniques illustrated in FIGS. 9a to 9d.

Figure 11A:
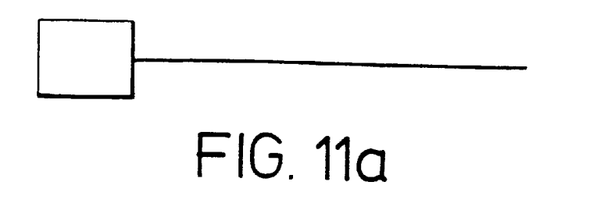
FIGS. 11a and 11b are schematic diagrams of superluminescent sources.
Figure 11B:
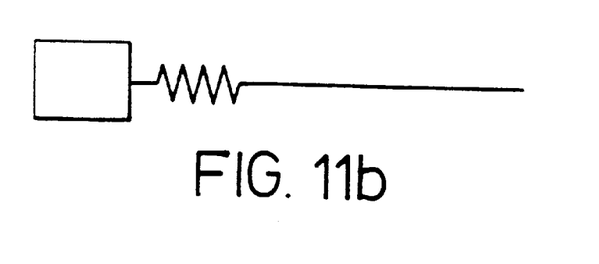

FIGS. 11a and 11b are schematic diagrams of "single pass" and "double pass" superluminescent sources respectively.

Superluminescent sources use the fibre amplifier characteristics of the doped chalcogenide glass as described above, but unlike fibre lasers they do not require feedback from both ends of the fibre.

In FIG. 11a, a pump source 120 feeds an amplifier 130 directly, with light emerging at an output 135 In FIG. 11b, a double-pass arrangement is shown in which a grating 125 is disposed between the pump source and the amplifier. Any light reflected back from the amplifier output 135 is then returned to the output 135 by the grating 125.

Figure 12:
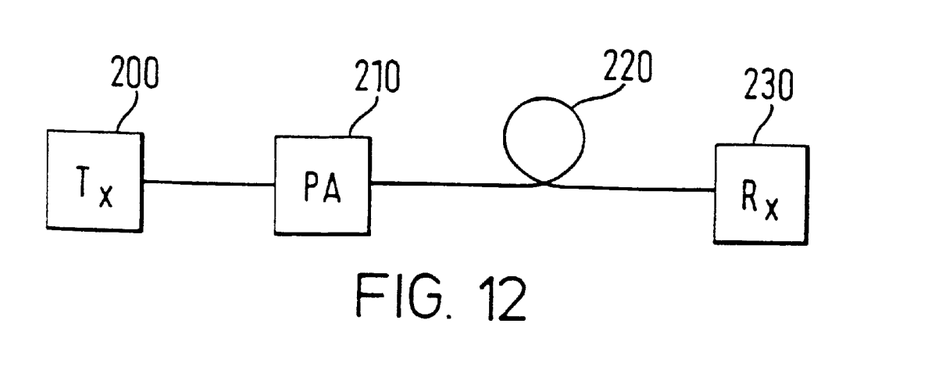
FIG. 12 is a schematic diagram of telecommunications apparatus.

Finally, FIG. 12 is a schematic diagram of an optical communication system using devices as described above. In particular, light from an optical transmitter 200 (which may include a laser as in FIG. 10) is supplied to a power amplifier 210 (e.g. an amplifier as in any of FIGS. 9a to 9d) before being transmitted along a length of optical fibre 220 to a receiver 230.

In summary, embodiments of the invention provide an optical fibre amplifier, laser or superluminescent source, consisting of a chalcogenide glass matrix hosting trivalent rare earth ions and which is doped with oxide in the form of a metallic oxide. The device utilizes the properties of the added oxide to improve the fabrication and efficiency of optical waveguide sources, in particular for applications around 1.3 μm. Specifically, in some cases the oxide presence can broaden the wavelength range for pump absorption, can broaden the wavelength range for light emission, can increase the device efficiency through a change in lifetime of certain laser levels and can modify properties of the glass to prevent crystallization during fibre fabrication. The device exploits the intentional addition of oxide to improve amplifier, laser, glass and fibre properties.

What is claimed is:

1. An optical waveguide amplifier comprising:
    a chalcogenide glass waveguide doped at least in part with:
        (a) a rare earth dopant; and
        (b) oxygen in the form of a metal oxide;
    wherein the total metal oxide content is about 0.01% to about 50% of the total weight of the glass; and
    a pump source for supplying pump radiation to the waveguide.

2. An amplifier according to claim 1, in which the chalcogenide glass is a sulphide glass.

3. An amplifier according to claim 1 or claim 2, in which the rare earth dopant is selected from the group consisting of cerium, praseodymium, neodymium, samarium, terbium, dysprosium, holmium, erbium and thulium.

4. An amplifier according to claim 3, in which the rare earth dopant is praseodymium in a proportion between about 10 parts per million and about 20000 parts per million.

5. An amplifier according to claim 4, the amplifier being operable to provide a gain greater than about 15 dB with input signal power of less than about −10 dBm, in which the pump wavelength is greater than about 1000 nm.

6. An amplifier according to claim 3, in which the rare earth dopant is dysprosium.

7. An amplifier according to claim 1, in which the pump radiation has a wavelength which preferentially excites dopant ions disposed in oxide sites within the glass.

8. An amplifier according to claim 7, in which the rare earth dopant is praseodymium in a proportion between about 10 parts per million and about 20000 parts per million.

9. An amplifier according to claim 8, in which the pump radiation has a wavelength greater than 900 nm and shorter than 1100 nm.

10. An amplifier according to claim 9, the amplifier being operable to provide an output signal power greater than 1 mW in which the pump wavelength is less than about 1010 nm.

11. An amplifier according to claim 10, in which the pump wavelength is about 980 nm.

12. An amplifier according to claim 8, the amplifier being operable to provide a gain greater than about 15 dB with input signal power of less than about −10 dBm, in which the pump wavelength is greater than about 1000 nm.

13. An amplifier according to claim 7, in which the rare earth dopant is dysprosium.

14. An amplifier according to claim 13, in which the pump radiation has a wavelength of about 800 nm, 1070 nm or 1260 nm.

15. An amplifier according to claim 1, in which the glass waveguide is doped with a further dopant selected from the Group 3A metals of the Periodic Table.

16. An amplifier according to claim 15, in which the further dopant is gallium, germanium, barium, cesium or arsenic.

17. An amplifier according to claim 16, in which the further dopant is gallium.

18. An amplifier according to claim 17, in which the glass waveguide is doped with a second further dopant wherein said second further dopant is germanium, barium, cesium or arsenic.

19. An amplifier according to claim 17, in which the glass waveguide is doped with a second further dopant wherein said second further dopant is lanthanum, yttrium, ytterbium or lutecium.

20. An amplifier according to claim 19, in which the second further dopant is lanthanum.

21. An amplifier according claim 1 in which the metal oxide is lanthanum oxide, yttrium oxide, ytterbium oxide, lutecium oxide, gallium oxide, germanium oxide, barium oxide, cesium oxide, arsenic oxide, cerium oxide, praseodymium oxide, neodymium oxide, samarium oxide, terbium oxide, dysprosium oxide, holmium oxide, erbium oxide or thulium oxide.

22. An amplifier according to claim 21, in which the metal oxide is lanthanum oxide.

23. An amplifier according to claim 1, in which the waveguide is an optical fibre.

24. An amplifier according to claim 23, in which the optical fibre is a single mode optical fibre, at least a core region of the fibre being doped with the rare earth dopant and the metal oxide.

25. An amplifier according to claim 1, comprising a semiconductor diode operable to pump the amplifier at a pump wavelength selected from the group consisting of: about 800 nanometres, about 980 nanometres and about 1280 nanometres.

26. An amplifier according to claim 1, comprising a neodymium-yttrium-aluminium-garnet laser for pumping the amplifier at a pump wavelength of about 1064 nanometres or a neodymium-yttrium-lanthanum-fluoride laser for pumping the amplifier at a pump wavelength of about 1047 nanometres.

27. A amplifier according to claim 1, in which the metal oxide content of the glass is between about 1% and about 50%.

28. A amplifier according to claim 1, in which the metal oxide content of the glass is between about 2% and about 50%.

29. A amplifier according to claim 1, in which the metal oxide content of the glass is between about 5% and about 50%.

30. A amplifier according to claim 1, in which the metal oxide content of the glass is between about 10% and about 50%.

31. A amplifier according to claim 1, in which the metal oxide content of the glass is between about 20% and about 50%.

32. A amplifier according to claim 1, in which the glass waveguide is doped with a sensitising agent to increase the absorption at the pump wavelength.

33. An amplifier according to claim 32, in which the sensitising agent is ytterbium.

34. An amplifier according to claim 33, comprising a pump source for pumping the amplifier at a pump wavelength of about 800 nm or 980 nm.

35. An optical waveguide laser oscillator comprising:
an optical waveguide amplifier according to claim 1 and;
a lasing reflector within the amplifier.

36. A laser oscillator according to claim 35, in which the reflector comprises gratings disposed at each end of the waveguide amplifier.

37. Telecommunications equipment comprising an optical waveguide amplifier having a laser oscillator according to claim 35 or claim 36.

38. An optical waveguide amplifier according to claim 1 wherein said optical waveguide amplifier comprises a superluminescent source.

39. Telecommunications equipment comprising an optical waveguide amplifier having a superluminescent source according to claim 38.

40. Telecommunications equipment comprising an optical waveguide amplifier according to claim 1.

41. A method of manufacture of an optical waveguide amplifier, the method comprising adding a metal oxide during formation of a doped glass optical waveguide, the resulting waveguide having an oxide content of at least 0.01% by weight.

42. An optical waveguide formed at least in part of a chalcogenide glass doped with:
(a) a rare earth dopant; and
(b) oxygen in the form of a metallic oxide;
wherein the total metal oxide content is about 5% to about 50% of the total weight of the glass.

43. An optical waveguide according to claim 42, in which the chalcogenide glass is a sulphide glass.

* * * * *